March 17, 1959 F. S. ALLINQUANT 2,878,045
LOWER ATTACHMENT FOR A TELESCOPIC SHOCK-ABSORBER
IN AN AUTOMOBILE VEHICLE SUSPENSION
Filed Nov. 15, 1955

United States Patent Office 2,878,045
Patented Mar. 17, 1959

2,878,045
LOWER ATTACHMENT FOR A TELESCOPIC SHOCK-ABSORBER IN AN AUTOMOBILE VEHICLE SUSPENSION

Fernand Stanislas Allinquant, Paris, France

Application November 15, 1955, Serial No. 546,903

Claims priority, application France November 16, 1954

1 Claim. (Cl. 287—85)

The present invention has for its object a lower attachment device for a telescopic shock-absorber in an automobile vehicle suspension.

In the method of assembly generally adopted at the present time, the lower attachment rod of the shock-absorber, which is either carried on the bottom of the cylinder or is formed by the extremity of the piston rod, depending on the direction in which the shock-absorber is mounted, is fixed to a plate rigidly secured to the arm of the non-suspended part of the vehicle on which the suspension is mounted, above an opening formed in the said arm, which enables the shock-absorber to be placed in position. The attachment rod passes through a hole in this plate, the hole being made slightly larger than the diameter of the rod, so as to provide a lateral clearance. The attachment rod is supported against the opposite faces of this plate by means of two thick rubber washers housed in oppositely-mounted dished metal members clamped against the plate by the tensile force exerted by a nut screwed on the extremity of the attachment rod, the elastic device on the other face being in abutment against a shoulder formed on the rod.

The angle formed between the axis of the telescopic shock-absorber and the arm of the suspension varies with the movements of the suspension, and the interposition of two elastic members constituted by the thick rubber washers ensures the necessary freedom for oscillatory movement. Now, these oscillating movements have a much greater amplitude in a vertical plane at right angles to the pivotal axis of the arm of the suspension than in a vertical plane parallel to the pivotal axis. The deformation of the rubber which takes place during the oscillation of the arm, produces by reaction a couple which results in lateral stresses being applied to the sliding members, and this may give rise to a number of difficulties during operation.

The device which forms the object of the invention enables these drawbacks to be avoided by reducing the reaction couple at the point of attachment during the course of the oscillation of the arm of the suspension.

It has been proposed in the United States patent application No. 539,246, filed on October 7, 1955, now Patent No. 2,856,197, issued October 14, 1958, to make use of knife-edge pivots to reduce the said reaction. However, in the case of an axial suspension, the latter is subjected, as long as the vehicle is resting on its wheels, to a compression stress which maintains the knife-edge in contact with its plate. On the other hand, in the case of a shock-absorber, the damping stresses which act in opposition to the movement of the suspension may have values which are substantially equal for movements during compression and during the recoil movement. The result of this is that the means which form the object of the patent application referred to above are not wholly satisfactory in the case of a shock-absorber. The device which forms the object of the present invention constitutes a special adaptation of these means to the case of a shock-absorber.

The device in accordance with the invention is characterised in that each of the said dish-shaped members has a bottom in the shape of a dihedral, the edge of which is in contact with the attachment plate and is maintained parallel to the pivotal axis of the arm. The means which ensures the maintenance of the orientation of these dished members may consist, for each of the said members, of two ribs rigidly fixed to the attachment plate and at right angles to the pivotal axis of the arm which serves as a guide for the flat lateral faces of these dished members at right angles to the edge of the dihedral formed at their base.

The invention will be described in the text which follows, reference being made to the attached drawings, in which.

Figure 1:
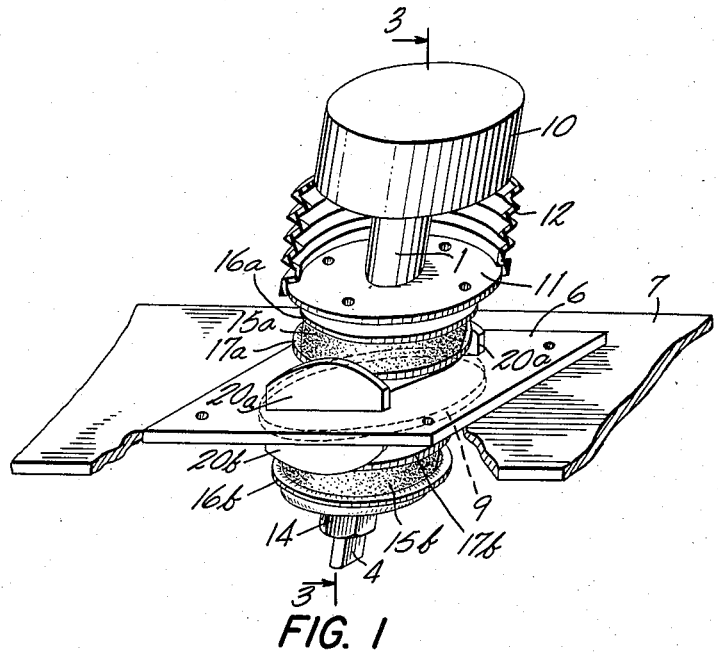
Fig. 1 is a fragmentary perspective view of a vehicle suspension assembly having a joint according to the invention.

In the device shown, the lower attachment rod is assumed to be the rod 1 of the piston, which is provided with a threaded portion 3 on the other side of a shouldered portion 2 close to its extremity, the rod terminating in a flattened end 4. This rod passes with a certain clearance through a hole 5, chamfered on both its faces and having a diameter slightly greater than the diameter of the rod, the hole being formed in an attachment plate 6 fixed to the arm 7 of the suspension (not shown), above an opening 9 having a diameter sufficient to permit of the passage of the cylinder 10 of the shock-absorber through this arm. Between each face of the plate 6 and, on the one hand, a washer 11 pierced with holes to which is fixed a bellows fitting 12 which protects the outlet joint of the piston rod on the outside of the cylinder, and which is supported against a shoulder 13 on the rod; and on the other hand, a nut 14 screwed on the threaded end of the rod; are interposed assemblies each comprising a thick rubber washer 15a or 15b, housed in an external dished member 16a or 16b and in a dished member 17a or 17b making contact with the plate 6. This assembly is well-known per se.

In accordance with the invention, the base of each dished contact member 17a or 17b is shaped in a dihedral so as to constitute a kind of knife-edge, the edge 18a or 18b of which is supported on each side of the hole 5 on a flat face of the plate 6 which serves as its pivot plate, means being provided for maintaining the edge of the dihedral directed parallel to the pivotal axis of the arm. In the example of construction shown, this orientation is ensured by the fact that the dished contact members have two flat lateral faces 19 having a direction at right angles to the said edge, and that along side these flat surfaces, flat steel plates 20a or 20b are welded edgewise on the plate 6 in a direction at right angles to the pivotal axis of the arm of the suspension, with a space corresponding to the distance of these lateral faces, with allowances for a slight play.

Figures 2, 3:
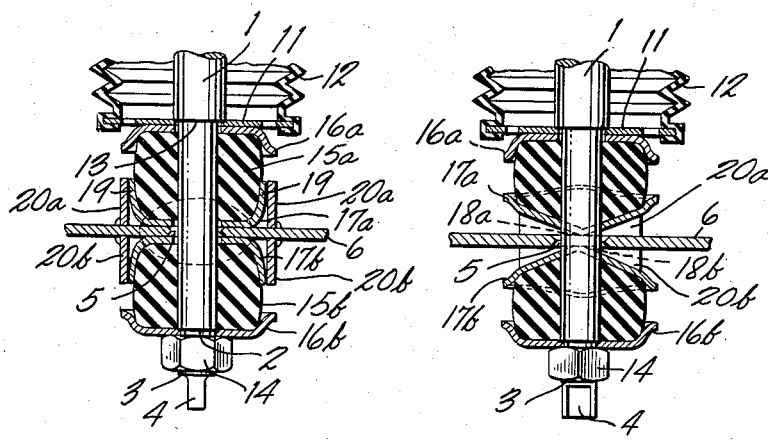
Fig. 2 is an axial cross section view of the device taken at ninety degrees to the view of Fig. 3.
Fig. 3 is an axial cross section view of the device taken along line III—III of Fig. 1.

By screwing up the nut 14 until the dished portion 16b comes into abutment with the shoulder 2, the assembly of rubber washers 15a and 15b is compressed, as shown in Figs. 2 and 3, thus applying the two edges 18a and 18b with an elastic pressure against the opposite faces of the plate. Depending on whether the shock-absorber is working in compression or on the return movement, the upper washer 15a or the lower washer 15b is respectively the more strongly compressed. The knife-edge 18a or 18b corresponding, which is applied with the greatest force against the plate, serves as the pivotal axis of the shock-absorber with respect to the arm of the suspension. During the course of this oscillation, the other knife-edge carries out very small sliding movements on the opposite flat face. This frictional effect has no great influence on the mobility of the pivotal joint and the reaction couple is low, considerably less than in the case of the usual type of assembly in which it is produced by the reaction of the rubber washers which are more powerfully compressed on one side of the axis than on the other. The lateral stresses of the sliding members of the telescopic shock-absorber are thus considerably reduced for oscillations of large amplitude of the arm of the suspension. The possibility of transverse oscillation remains assured by the flexibility of the rubber washers.

The application of the device is, furthermore, not limited to shock-absorbers, and may also be made to an axial suspension member, whether damped or not.

What I claim is:

In a vehicle suspension assembly having a pivotally mounted oscillatable arm, a shock absorber having an axially displaceable rod, a plate fixed on said arm and having an aperture through which said rod passes freely, a joint connecting the shock absorber to said plate comprising a pair of resilient blocks disposed bearing on opposite faces of the plate, abutment means on the rod for holding the blocks in a seated position on the plate, for each block a dished contact member engaging a corresponding face of the plate on which the corresponding block bears, the blocks being disposed extending axially on said rod and each being disposed in one of the dished contact members, each dished member having relatively inclined faces forming the bottom thereof engaging said plate thereby to form an edge along which contact is made with said plate and each having parallel portions substantially normal to said edge and extending axially of a corresponding block, means comprising spaced, parallel wall portions secured to and extending normal to the opposed faces of the plate for guiding the parallel portions of the individual contact members which are normal to said edge.

References Cited in the file of this patent
UNITED STATES PATENTS

| | | |
|---|---|---|
| 1,871,918 | Roseman | Aug. 16, 1932 |
| 2,504,890 | Sisson | Apr. 10, 1950 |
| 2,574,788 | Janeway et al. | Nov. 13, 1951 |
| 2,690,818 | Janeway et al. | Oct. 5, 1954 |

FOREIGN PATENTS

| | | |
|---|---|---|
| 694,668 | Great Britain | July 22, 1953 |